United States Patent
Okato et al.

(10) Patent No.: US 8,914,385 B2
(45) Date of Patent: Dec. 16, 2014

(54) SEARCH DEVICE AND SEARCH PROGRAM

(75) Inventors: Yohei Okato, Tokyo (JP); Tomohiro Iwasaki, Tokyo (JP); Toshiyuki Hanazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 58 days.

(21) Appl. No.: 13/579,302

(22) PCT Filed: Feb. 24, 2010

(86) PCT No.: PCT/JP2010/001239
§ 371 (c)(1),
(2), (4) Date: Aug. 16, 2012

(87) PCT Pub. No.: WO2011/104754
PCT Pub. Date: Sep. 1, 2011

(65) Prior Publication Data
US 2012/0317098 A1    Dec. 13, 2012

(51) Int. Cl.
*G06F 7/00* (2006.01)
*G06F 17/30* (2006.01)
*G06F 17/27* (2006.01)

(52) U.S. Cl.
CPC ........ *G06F 17/30613* (2013.01); *G06F 17/277* (2013.01)
USPC ...................................................... 707/749

(58) Field of Classification Search
CPC ..................... G06F 17/30542; G06F 17/30613
USPC ................................................. 707/742
See application file for complete search history.

(56) References Cited

U.S. PATENT DOCUMENTS

| | | | |
|---|---|---|---|
| 6,546,401 B1 * | 4/2003 | Iizuka et al. | 1/1 |
| 2004/0260694 A1 * | 12/2004 | Chaudhuri et al. | 707/5 |
| 2007/0260595 A1 * | 11/2007 | Beatty et al. | 707/5 |
| 2009/0216752 A1 * | 8/2009 | Terui et al. | 707/5 |
| 2010/0125594 A1 * | 5/2010 | Li et al. | 707/758 |

FOREIGN PATENT DOCUMENTS

| | | |
|---|---|---|
| JP | 3 194653 | 8/1991 |
| JP | 7 85033 | 3/1995 |
| JP | 3636941 | 4/2005 |
| JP | 3665112 | 6/2005 |
| JP | 3715672 | 11/2005 |
| JP | 2006 172372 | 6/2006 |

OTHER PUBLICATIONS

International Search Report Issued Mar. 30, 2010 in PCT/JP10/01239 Filed Feb. 24, 2010.

* cited by examiner

*Primary Examiner* — James E Richardson
(74) *Attorney, Agent, or Firm* — Oblon, Spivak, McClelland, Maier & Neustadt, L.L.P.

(57) ABSTRACT

An index generating unit divides each name data of search target data both into words and into characters, calculates start and end scores showing a start and an end of each of the words and start and end scores showing a start and an end of each of the characters, links them to each entry word which constructs the name data as a list (a name ID, a position, and start and end scores), and stores this list in an index storage unit. A searching unit decomposes an input character string into partial character strings, acquires corresponding candidate entries from the index storage unit, and judges the continuity between candidate entries on the basis of lists to add a comparison score according to the continuity to a candidate entry.

5 Claims, 5 Drawing Sheets

FIG.3

| Name ID | Writing | Reading |
|---|---|---|
| 01 | 東京都<br>(toukyouto) | トウキョウト<br>(toukyouto) |
| 02 | 右京<br>(ukyou) | ウキョウ<br>(ukyou) |

FIG.4

| Name ID | Writing | Reading |
|---|---|---|
| 01 | 東京／都<br>(toukyou/to) | トウキョウ／ト<br>(toukyou/to) |
| 02 | 右京<br>(ukyou) | ウキョウ<br>(ukyou) |

FIG.5

| Name ID | Writing | Reading |
|---|---|---|
| 01 | 東／京／都<br>(tou/kyou/to) | トウ／キョウ／ト<br>(tou/kyou/to) |
| 02 | 右／京<br>(u/kyou) | ウ／キョウ<br>(u/kyou) |

FIG.6

| Entry | Name ID | Position | Word Start Point | Word End Point | Character Start Point | Character End Point | Start Score | End Score |
|---|---|---|---|---|---|---|---|---|
| トウ<br>(tou) | 01 | 1 | 1 | 0 | 1 | 1 | 2 | 1 |
| ウキョ<br>(ukyo) | 01 | 2 | 0 | 0 | 0 | 0 | 0 | 0 |
| キョウ<br>(kyou) | 01 | 3 | 0 | 1 | 1 | 1 | 1 | 2 |
| ウト<br>(uto) | 01 | 4 | 0 | 1 | 0 | 1 | 0 | 2 |
| ウキョ<br>(ukyo) | 02 | 1 | 1 | 0 | 1 | 0 | 2 | 0 |
| キョウ<br>(kyou) | 02 | 2 | 0 | 1 | 1 | 1 | 1 | 2 |

| Entry | List (Name ID, Position, Start and End Scores) |
|---|---|
| トウ<br>(tou) | (01,1,21) |
| ウキョ<br>(ukyo) | (01,2,00),(02,1,20) |
| キョウ<br>(kyou) | (01,3,12),(02,2,12) |
| ウト<br>(uto) | (01,4,02) |

FIG.10

|  |  | Start Score of Part in Indexes to Which Comparison Is Being Made Index[i][j].begin | | |
|---|---|---|---|---|
|  |  | 0 | 1 | 2 |
| End Score of Part to Which Comparison Was Made Immediately Before boundary[id] | 0 | 0.1 | 0.2 | 0.6 |
|  | 1 | 0.2 | 0.6 | 0.9 |
|  | 2 | 0.4 | 0.7 | 1.0 |

SEARCH DEVICE AND SEARCH PROGRAM

FIELD OF THE INVENTION

The present invention relates to a search device for and a search program for searching for the name of a search target from indexes which are generated in advance.

BACKGROUND OF THE INVENTION

When carrying out a full text search, a conventional search device can generate a large volume of indexes with which a name which is a search target can be referred to in advance from partial character strings which constructs the name by using a lot of document data to carry out a partial match search on the large volume of indexes at a high speed. A word or a character N-gram is used as the smallest unit to be searched for. When words are defined as search units, while search results which are appropriate linguistically can be expected to be acquired, a search omission occurs when an error occurs in a prior language analysis. Further, such a conventional search device cannot carry out a search in units of an element shorter than a word. On the other hand, when character N-grams are defined as search units, while no search omission occurs, there is a possibility that candidates for the name each having delimiters which are not appropriate linguistically appear out of the blue. For example, although it is impossible to bring a word delimiter indicating "東京 (toukyou)/都 (to)" (the slash shows a delimiter) into correspondence the following word: "京都 (kyouto)", it is possible to bring the following characters: "京 (kyou)/都 (to)" into correspondence with character delimiters indicating "東 (tou)/京 (kyou)/都 (to)" through a match partial search. Therefore, although "京都 (kyouto)" is not included in search results when making a search for "東京都 (toukyoto)" on a word by word basis, ""京都 (kyouto)" is included in search results when making a search for "東京都 (toukyoto)" on a character by character basis, and this search result does not have linguistic validity.

In order to solve this problem, such a conventional search device is constructed in such a way as to be able to carry out a search on a word by word basis and on a character by character basis. A problem is, however, that the time required to generate indexes and the search time required to carry out a search are increased to the sum of the time required to generate indexes for a search on a word by word basis and the sum of the time required to generate indexes for a search on a character by character basis, and the sum of the search time required to carry out a search on a word by word basis and the search time required to carry out a search on a character by character basis. In contrast with this, an information search device disclosed in patent reference 1 adds word information to each index which is a character unit, and makes a search on a word by word basis and on a character by character basis in a complex manner, thereby suppressing an increase in the processing time.

Further, when setting a name which a user has uttered as a search term, and making a name search for names each of which partially matches an index, for example, a fuzzy match search technique is useful because the name uttered by the user does not always match an index partially. Patent references 2 and 3 propose fuzzy match search techniques using indexes for full text search. A character string search device disclosed by patent reference 2 divides a search term into character N-grams, searches through the indexes for a name which partially matches each of the character N-grams, and outputs the name including the largest number of character N-grams each of which partially matches the search term as a search result. Further, a text search device disclosed by patent reference 3 counts the number of characters in each index each of which appears at the same position as the same character in a search term or at a position falling with a predetermined range from the position of the same character to calculate the degree of similarity of each index, and outputs the name having the highest degree of similarity as a search result.

RELATED ART DOCUMENT

Patent Reference

Patent reference 1: Japanese Patent No. 3636941
Patent reference 2: Japanese Patent No. 3665112
Patent reference 3: Japanese Patent No. 3715672

SUMMARY OF THE INVENTION

Because conventional search devices are constructed as above, a problem with a fuzzy match search in a full text search device using indexes is that an error out of the blue easily occurs and the degree of search accuracy is low because various comparisons are allowed. Particularly, when making a search on the basis of a search term which is close to a voice expression based on search units, such as Japanese kana characters (about 100 characters) or English phonemic symbols (about 40 phonemic symbols), the increase in the number of candidates is remarkable because the number of characters or symbols are small compared with the number of words and the number of Chinese characters, and a higher degree of fuzziness is provided. However, in a case in which indexes which are word units are generated, a search omission occurs when an analysis error occurs at the time of generating the indexes, as mentioned above, while there is a possibility that the search term is erroneously divided into words at the time of making a search. Further, such a technique based on the indexes cannot support a paraphrase which is often seen in Japanese and which is a word degenerated (e.g. "総研 (souken)" which is an abbreviation of "総合研究所 (sougoukenkyujyo)"). A further problem is that in a case in which the search term is voice data, even though voice recognition is erroneously performed on only one character, the acquisition of the word fails and a candidate which is very far from the original search term in similarity is selected.

The present invention is made in order to solve the above-mentioned problems, and it is therefore an object of the present invention to provide a search device and a search program which implement a high-precision fuzzy match search by making a search for an input character string which is a search target on the basis of minimum units while taking the linguistic validity based on longer units into consideration.

In accordance with the present invention, there is provided a search device including: a name analysis unit for dividing name data which consists of a character string into plural piece data in at least one type of units to generate boundary information showing a start and an end of each of the above-mentioned plural piece data; a start and end information adding unit for extracting partial character strings which construct the name data to define the partial character strings as entries, and for adding position information about a position of each of the entries in the name data, and the boundary information of the piece data included in the above-mentioned entry to this entry; and a partial character string index generating unit for sorting output results of the start and end information adding unit in order of the entries to generate indexes.

Further, in accordance with the present invention, there is provided a search program for causing a computer to function as: a name analysis unit for dividing name data which consists of a character string into plural piece data in at least one type of units to generate boundary information showing a start and an end of each of the above-mentioned plural piece data; a start and end information adding unit for extracting partial character strings which construct the name data to define the partial character strings as entries, and for adding position information about a position of each of the above-mentioned entries in the name data, and the boundary information of the piece data included in the above-mentioned entry to this entry; and a partial character string index generating unit for sorting output results of the start and end information adding unit in order of the entries to generate indexes.

According to the present invention, because name data which consists of a character string is divided into plural piece data in at least one type of units to generate boundary information showing a start and an end of each of the plural piece data, and position information about the position of each of the entries in the name data and the boundary information of the piece data included in the above-mentioned entry are added to the entry to generate indexes, while a search for an input character string which is a search target is made on a per-minimum-unit basis, the linguistic validity based on longer units can also be taken into consideration. As a result, a high-precision fuzzy match search can be implemented.

BRIEF DESCRIPTION OF THE FIGURES

FIG. 3 is a view showing an example of search target data;

FIG. 4 is a view showing an example of search target data each of which is divided into words in writing;

FIG. 5 is a view showing an example of search target data each of which is divided into characters in writing;

FIG. 6 is a view showing an example of a table which is generated by a start and end information adding unit;

FIG. 10 is a view showing an example of a comparison score table.

EMBODIMENTS OF THE INVENTION

Hereafter, in order to explain this invention in greater detail, the preferred embodiments of the present invention will be described with reference to the accompanying drawings.

Embodiment 1

Figure 1:
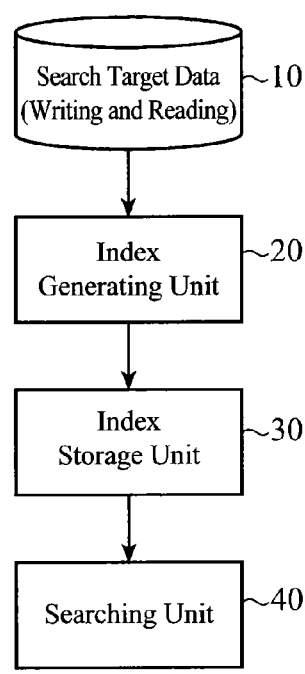
FIG. 1 is the functional block diagram showing the structure of a search device in accordance with Embodiment 1 of the present invention.
Figure 2:
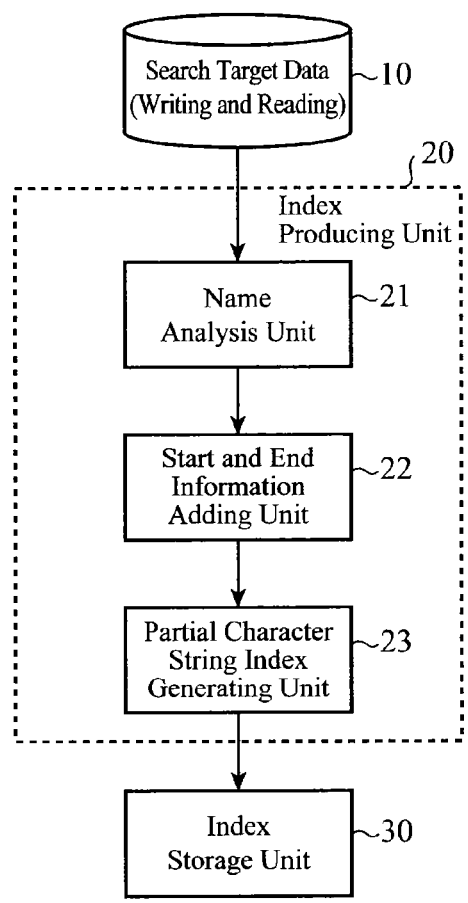
FIG. 2 is a functional block diagram showing the internal structure of an index generating unit shown in FIG. 1.
Figures 7, 8:
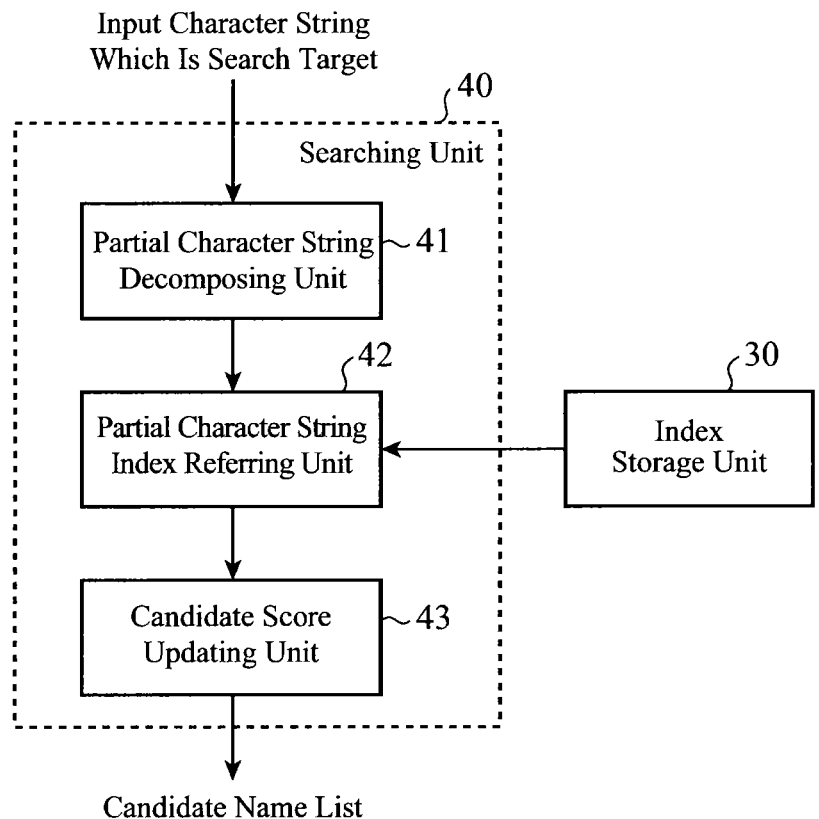
FIG. 7 is a view showing an example of a list (a name ID, a position, and start and end scores) which is generated by a partial character string index generating unit.
FIG. 8 is a functional block diagram showing the internal structure of a searching unit.

A search device shown in FIG. 1 is provided with an index generating unit 20 for generating indexes in advance from search target data 10, an index storage unit 30 for storing the indexes, and a searching unit 40 for comparing input data (an input character string) inputted thereto as data for search with the indexes to acquire candidates similar to the input data. The internal structure of the index generating unit 20 is shown in FIG. 2, and the internal structure of the searching unit 40 is shown in FIG. 8. This search device is used for making a search through a lot of candidates for name on the basis of a reading character string to acquire candidates having a high degree of validity from among partially matching candidates including a candidate having a different word order and a candidate having a partial omission.

The search target data 10 are name data about the names of search targets, and serve as a basis of the indexes. Each name data includes at least a reading which is a character string to be compared with the input data, and a name ID for identifying this name data. In an example of the search target data 10 shown in FIG. 3, each name data is comprised of a name ID, a writing, and a reading.

A name analysis unit 21 in the index generating units 20 shown in FIG. 2 reads the information on the search target data 10, and divides the character string which constructs each name data into plural piece data into one or more types of linguistic units while making reference to dictionary information. As concrete linguistic units, for example, word (morpheme) units and character units each corresponding to a writing of one character are provided in the case of Japanese. In this embodiment, the name analysis unit analyzes the character string in the two types of linguistic units which are a combination of word units and character units. The reason that the name analysis unit analyzes the character string in the two types of linguistic units is because the degrees of analysis accuracy both in word units and in character units differ from each other and receptiveness is provided for each paraphrase which is acquired in a step-by-step manner. There is a possibility that while the analysis of the character string on a word-by-word basis has a strong linguistic constraint, the analysis result includes an analysis error, and there is also a possibility that the analysis cannot deal with a paraphrase whose length is shorter than words. The analysis of the character string on a character-by-character basis has a high degree of analysis accuracy. Further, in most cases, characters are minimum units of paraphrases. In the dictionary, characters, words and their readings, and indication values each used for adding a separator correctly and each showing the degree of appearance of either a character or word itself or a character or word coinciding with another character or word are stored. These indication values are statistically learned in such a way that a score which is the sum of indication values has a large value for correct separators on the basis of a large volume of text data including information about the correct separators.

The name analysis unit 21 outputs the readings of words into which the input character string is divided and the score of this division, and the readings of characters into which the input character string is divided and the score of this division as an analysis result while making reference to the dictionary information. The addition of separators is carried out in such a way that a score at the time of using each arbitrary separating method is calculated on the basis of indication values read from the dictionary, and a set of separators which provides the largest score is determined. An example of search target data 10 each of which has a writing divided into words is shown in FIG. 4, and an example of search target data 10 each of which has a writing divided into characters is shown in FIG. 5. In FIGS. 4 and 5, each slash (/) shows a separator.

A start and end information adding unit 22 decomposes the analysis result acquired by the name analysis unit 21 into partial character strings (entries) which are to be stored as indexes, and generates a table which consists of the position of each entry which appears in the name of the partial character string, and the word start point, the word end point, the character start point and the character end point of each entry in the analysis result. An example of the table generated by the start and end information adding unit 22 is shown in FIG. 6. In this example, each entry having a reading (each reading in the figure) is a bigram which is a unit of moras. A mora is a unit corresponding to a haku in Japanese. In an entry having a start point of "1", this start point shows that there is a boundary between words or characters at one character before the reading of this entry. In an entry having an end point of "1", this end point shows that there is a boundary between words or characters at two characters after the reading of this entry. For example, the partial character string "トウ(tou)" of "トウキョウ(toukyoto)" having a name ID of "01" starts from a position of "1", is the start point of a word unit, and has the start point and the end point of a character unit.

In addition, the start and end information adding unit 22 adds start and end point boundary information to each entry by using the information about the start point and the end point defined for each word unit and the start point and the endpoint defined for each character unit. Because each word boundary is included in a character boundary in this example, the start and end point boundary information can be one of the following three possible values: "2" in a case in which the entry has a word boundary and a character boundary, "1" in a case in which the entry has a character boundary which is not a word boundary, and "3" in other cases. In an example of the start and end point boundary information shown in FIG. 6, score values based on the above-mentioned three possible values are assigned to a start score and an end score of each entry, respectively.

A partial character string index generating unit 23 refers to the table generated by the start and end information adding unit 22 to bring each of the entries into correspondence with one or more lists each of which consists of a name ID, a position, and start and end scores, and sorts the one or more lists for each entry to provide them as indexes. An example of the one or more lists (each having a name ID, a position, and start and end scores) generated by the partial character string index generating unit 23 is shown in FIG. 7. For example, because the entry of "ウキョ(ukyo)" is included in both the name of "トウキョウト(toukyouto)" and the name of "ウキョウ(ukyou)", the entry is brought into correspondence with the two name IDs of "01" and "02".

The index storage unit 30 stores the indexes of the entries which are generated by the partial character string index generating unit 23 therein, and enables each list (a name ID, a position, and start and end scores) which is brought into correspondence with an entry to be acquired.

A partial character string decomposing unit 41 included in the searching units 40 shown in FIG. 8 decomposes an input character string which is a search target inputted to the search device into partial character strings according to the same criterion used at the time when the index generating unit 20 decomposes each name into entries. Hereafter, it is assumed that the partial character string decomposing unit decomposes the input character string which is a search target into bigrams each of which is a unit of moras according to the above-mentioned explanation.

A partial character string index referring unit 42 searches for entries each matching one of the partial character strings included in the input character string from the index storage unit 30 to retrieve the lists of these entries (each having a name ID, a position, and start and end scores) for each of the partial character strings.

A candidate score updating unit 43 updates a comparison history and a candidate score for the list (a name ID, a position, and start and end scores) of each of the candidate entries which are acquired by the partial character string index referring unit 42, and decides a candidate name list which is to be outputted according to candidate scores which are determined at the time when reaching the end of the partial character strings inputted thereto. The details of the candidate score updating unit 43 will be mentioned later.

Figure 9:
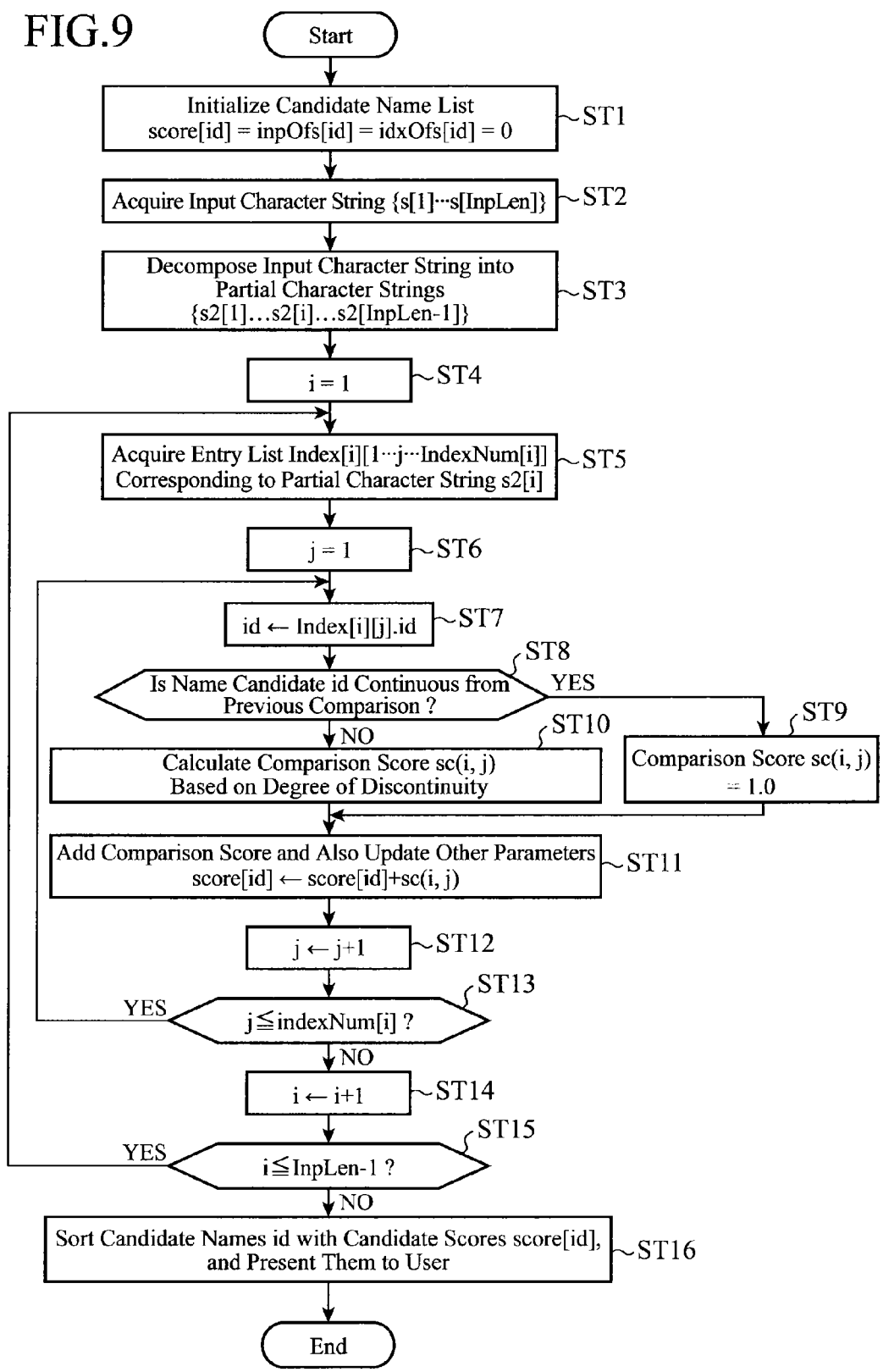
FIG. 9 is a flow chart explaining the operation of the searching unit.

Next, the operation of the searching unit 40 will be explained by using a flow chart shown in FIG. 9. The searching unit 40 has a candidate name list (candidate name list), and calculates a candidate score by using this candidate name list as a comparison history for temporarily holding various pieces of information about name data which the partial character string index referring unit 42 has acquired from the index storage unit 30. More specifically, for each of candidate names id(s) (1≤id≤maximum name ID) of name data (referred to candidate names from here on) which are candidates for name, this candidate name list includes the following pieces of information:

score[id]; a candidate score, inpOfs[id]; the position of a partial character string to which a comparison is being made in an input character string (referred to as the input character string comparison position from here on), idxOfs[id]; the position of an entry to which a comparison is being made in the candidate name (referred to as the candidate name comparison position from here on), boundary[id]; the end score of an entry to which a comparison was made the last time in the candidate name (referred to as the immediately preceding entry end score from here on).

While the searching unit 40, in step ST1, initializes the candidate score, the input character string comparison position and the candidate name comparison position in the candidate name list to score[id]=inpOfs[id]=idxOfs[id]=0, the searching unit sets the immediately preceding entry end score to boundary[id]=2. In this embodiment, boundary[id] shows only the end one of the start and end scores, and boundary[id] =2 shows that the end of the entry has a value of "2" showing that the end is a word boundary and a character boundary.

The searching unit 40, in step ST2, acquires an input character string which is a search target. The partial character string decomposing unit 41, in next step ST3, decomposes the input character string acquired by the searching unit into partial character strings to generate a partial character string list. Each of the partial character strings is a bigram which is a unit of motors, as mentioned above. When the reading of the input character string is expressed as InpLen moras {s[1], s[2], . . . , s[InpLen]}, each partial character string is expressed as s2[i]=(s[i], s[i+1]). The subscript i shows the character position of each partial character string in the input character string, and has a range of 1≤i≤InpLen−1.

For example, when the reading of the input character string is "ウキョウ(ukyou)", InpLen is three (the input character string includes the following three moras: "ウ(u)", "キョ(kyo)" and "ウ(u)"), and "ウキョ(ukyo)" which is expressed as s2[1] and "キョウ (kyou)" which is expressed as s2[2] are included in the partial character string list.

The partial character string decomposing unit 41, in step ST4, initializes the subscript i to i=1, and causes the comparison process to be started from the head partial character string s2[1] included in the input character string.

The partial character string index referring unit 42, in step ST5, refers to the index storage unit 30 for each of the partial character strings to acquire the list (a name ID, a position, and start and end scores) of each of one or more entries (each referred to a candidate entry from here on) matching each of the partial character strings and generate a candidate entry list. The number of candidate names corresponding to the i-th character position is expressed as IndexNum[i]. Further, the one or more candidate entries corresponding to the partial character string at the i-th character position are expressed as Index[i][j] (1≤j≤IndexNum[i]). The subscript j shows the candidate entry on which the comparison process is to be carried out the next time. More specifically, the name ID, the position, the start score and the end score in the candidate entry list which is brought into correspondence with the j-th candidate entry are expressed in the following way:
Index[i][j].id; name ID,
Index[i][j].ofs; position,
Index[i][j].begin; start score,
Index[i][j].end; end score.

For example, the one or more candidate entries corresponding to the partial character string s2[1] of "ウキョ(ukyo)" of the input character string of "ウキョウ(ukyou)" are "ウキョ(ukyo)" (01, 2, 00) and "ウキョ(ukyo)" (02, 1, 20). In this case, because there are two (=IndexNum[1]) candidate names corresponding to the i=1st partial character string of "ウキョ(ukyo)" as follows: "トウキョウト(toukyouto)" having a name ID of 01 and "ウキョウ(ukyou)" having a name ID of 02, the j=1st candidate entry is defined as "ウキョ(ukyo)" (01, 2, 00) having a name ID of 01 and the j=2nd candidate entry is defined as "ウキョ(ukyo)" (02, 1, 20) having a name ID of 02. Therefore, in the candidate entry list, the information which is brought into correspondence with the j=1st candidate entry "ウキョ(ukyo)" is Index[1][1].id=01, Index[1][1].ofs=2, Index[1][1].begin=0, and Index[1][1].end=0.

The partial character string index referring unit 42, in step ST6, initializes the subscript j to 1, and, in next step ST7, converts the candidate name list into id=Index[i][j].id. When there are two or more candidate names corresponding to the partial character string s2[1] of "ウキョ(ukyo)", like "トウキョウト(toukyouto)" and "ウキョウ(ukyou)", the partial character string index referring unit causes the search unit to start the comparison process from the head entry of one of the plural candidate names first.

The candidate score updating unit 43, in step ST8, makes a comparison among the candidate name list of the indexes, the candidate entry list, and the list of partial character strings of the input character string to judge the continuity in the input character string. In a state in which Index[i][j].id showing the name ID of the one or more candidate entries are already included in the candidate name list, and the input character string comparison position inpOfs[id] is advanced by one (in this case, by one mora unit) and the candidate name comparison position idxOfs[id] is advanced by one (in this case, by one mora unit), i.e. when the travel distance of the comparison position on the candidate name satisfies the following equation: Index[i][j].ofs-idxOfs[id]=1 and the travel distance of the comparison position on the input character string satisfies the following equation: i-inpOfs[id]=1, the candidate score updating unit judges that the continuity is maintained. Otherwise, the candidate score updating unit judges that the continuity is not maintained.

When the input character string which is a search target is the result of voice recognition on a voice input, the constraint on the continuity judgment is eased as follows. In a state in which the input character string comparison position inpOfs[id] and the candidate name comparison position idxOfs[id] are advanced by arbitrary numbers D1 and D2, respectively, i.e. when the travel distance of the comparison position on the candidate name satisfies the following equation: 1≤Index[i][j].ofs-idxOfs[id]=D1 and the travel distance of the comparison position on the input character string satisfies the following equation: 1≤i-inpOfs[id]=D2, the candidate score updating unit judges that the continuity is maintained, thereby permitting some variations.

When the continuity is maintained (when "YES" in step ST8), the candidate score updating unit 43, in next step ST9, sets a comparison score sc(i,j)=1.0 to the candidate entry to which a comparison is being made. The candidate score updating unit sets the comparison score sc(i,j) which is a maximum value to the candidate entry when the continuity is maintained, whereas the candidate score updating unit adjusts the value of the comparison score according to the degrees of the linguistic validity of the candidate entries when the continuity is not maintained.

When the continuity is not maintained (when "NO" in step ST8), the candidate score updating unit 43, in next step ST10, selects a comparison score sc(i,j) for the candidate entry to which a comparison is being made from the comparison score table on the basis of both the end score boundary[id] of the candidate entry (i.e. the immediately preceding entry) which is stored in the candidate name list and to which a comparison was made the last time, and the start score Index[i][j].begin of the candidate entry to which a comparison is being made stored in the candidate entry list.

An example of the comparison score table is shown in FIG. 10. In this example, when the candidate entry to which a comparison was made the last time has the end point of a word, and the candidate entry on which a comparison is being made has the start point of a word in the candidate name, the candidate score updating unit sets a comparison score sc(i,j) of 1.0 which is a maximum to the candidate entry on which a comparison is being made because it can be assumed that there is an exchange in word order in units of a word in the candidate name, and hence there is linguistic validity between them. Further, when the candidate entry to which the comparison was made the last time has the end point of a character, and the candidate entry on which a comparison is being made has the start point of a word in the candidate name, the candidate score updating unit sets a high comparison score of 0.9 to the candidate entry on which a comparison is being made because it can be assumed that the candidate name is a paraphrase in which the end of a word is omitted. The pattern of a paraphrase which is assumed to be expected can be limited by the comparison scores stored in the comparison score table in this way.

As an alternative, the pattern of a paraphrase which is assumed to be expected can be limited by providing a penalty, instead of the above-mentioned comparison score sc(i,j), for the candidate entry on which a comparison is being made when, for example, the travel distance calculated in step ST7 is negative. More specifically, in a case in which the input character string can include an input error, such as an omission error, an insertion error, or a replacement error, the candidate score updating unit decreases the comparison score sc(i,j) when the travel distance of the comparison position on the candidate name (i.e. a positional relationship between the entries in the name data) is negative. As an alternative, instead of directly adjusting the comparison score sc(i,j), the candidate score updating unit can use another weight according to whether the travel distance is positive or negative. As a result, the candidate score updating unit can prevent the search results from including an exchanged word having an exchange in word order, like in the above-mentioned case.

The candidate score updating unit 43, in step ST11, adds the comparison score sc(i,j) to the candidate score score[id] for the candidate name id (score[id]=score[id]+sc(i,j)). The candidate score updating unit 43 further updates information other than the candidate scores of the candidate name list at the time of comparison score sc(i,j)>0. Because the candidate score updating unit can specify that the comparison process has been carried out by updating the input character string comparison position and the candidate name comparison position through this updating process, the information about these comparison positions can be used as a comparison history. More specifically, the candidate score updating unit updates the candidate score, the input character string comparison position, the candidate name comparison position, and the immediately preceding entry end score as follows:

score[id]=score[id]+sc(i,j),
inpOfs[id]=i,
idxOfs[id]=Index[i][j].end, and
boundary[id]=Index[i][j].end.

For example, because the j=1st candidate entry of "ウキョ(ukyo)" (the candidate name of id01) for the i=1st partial character string of "ウキョ(ukyo)" has a travel distance of 2 (=2−0) of the comparison position on the candidate name of "トウキョウト(toukyouto)" and a travel distance of 1 (=1−0) of the comparison position on the input character string of "ウキョウ(ukyou)", it is judged that the continuity is not maintained, and the comparison score sc(1,1)=0.4 is added to the candidate entry according to the comparison score table shown in FIG. 10. Through this comparison process, the candidate score of the candidate name of "トウキョウト(toukyouto)" (the candidate name of id01) is updated to score [01]=0+0.4=0.4.

The searching unit 40, in step ST12, updates the subscript j to j=j+1 to cause the i-th partial character string on which a comparison is being made to be compared with the next candidate name, and, in next step ST13, checks to see whether the searching unit has completed the comparison between the i-th partial character string and all of the IndexNum[i] candidate names. Unless the searching unit has not completed the comparison between the i-th partial character string and all the candidate names (j≤IndexNum[i], i.e. when "YES" in step ST13), the searching unit returns to step ST7 and carries out the comparison process of steps ST7 to ST11 on all of the remaining candidate names. However, when two or more same name IDs exist at different positions of the input character string, the searching unit selects the position which maximizes the candidate score in which the comparison scores have been summed on a priority basis.

For example, when having not completed the comparison between the partial character string and all the candidate names, the searching unit makes a comparison between the i=1st partial character string "ウキョ(ukyo)" and the j=2nd candidate entry of "ウキョ(ukyo)". Because this candidate entry of "ウキョ(ukyo)" has a travel distance of 1 (=1−0) of the comparison position on the candidate name of "ウキョウ(ukyou)" (the candidate name of id02) and a travel distance of 1 (=1−0) of the comparison position on the input character string of "ウキョウ(ukyou)", it is judged that the continuity is maintained, and the comparison score sc(1,2)=1.0 is assigned to the candidate entry. Through this comparison process, the candidate score of the candidate name of "ウキョウ(ukyou)" (the candidate name of id02) is updated to score[02]=0+1.0=1.0.

When having completed the comparison between the partial character string and all the candidate names (j>IndexNum[i], i.e. when "NO" in step ST13), the searching unit 40, in next step ST14, updates the subscript i to i=i+1 to cause the next partial character string in the input character string to be compared with each of the candidate names, and, in step ST15, further checks to see whether the searching unit has completed the comparison process on all of the InpLen partial character strings included in the input character string.

For example, when having not completed the comparison on all the partial character strings, the searching unit carries out the comparison process on the i=2nd partial character string, i.e. "キョウ(kyou)" which is the partial character string s2[2] of the input character string of "ウキョウ(ukyou)" in the next comparison process.

When having completed the comparison on all of the InpLen partial character strings (i>InpLen-1, i.e. when "NO" in step ST15), the partial character string index generating unit 23, in next step ST16, sorts the candidate names included in the candidate name list at the time of reaching the end of the input character string in order based on their candidate scores (e.g. in descending order of the candidate score), and outputs the candidate names sorted thereby as a candidate name list and presents this candidate name list to the user. In contrast, when having not completed the comparison on all of the InpLen partial character strings (i≤InpLen-1, i.e. when "YES" in step ST15, the searching unit 40 returns to step ST5 and carries out the comparison process on the next partial character string.

Because the searching unit 40 thus uses the start and end boundary information showing linguistic validity which is added to each entry which is included in the indexes generated by the index generating unit 20 and which constructs a name to carry out a fuzzy match search on the input character string, the search device provides an improved degree of accuracy as compared with a case in which the search device makes a search without using any start and end boundary information. Because the search device can further adjust the pattern of an acceptable paraphrase according to the constraint on the travel distances in the comparison process and the comparison scores stored in the comparison score table, the search device can deal with the input character string with flexibility in consideration of an omission error, an insertion error, and a replacement error which are caused by voice misrecognition in recognizing the input character string. For example, the search device can loosen the constraint on the extraction of a paraphrase to extract an expected word in a wide manner, or can restrain the extraction of a paraphrase by, on the contrary, attaching great importance to the accuracy.

In the above-mentioned explanation, Japanese writings and readings are provided as an example. This embodiment is not limited to this example. Also in a case in which the search device is applied to English, the search device can carry out the same processes by using syllables as character units, using phonemes or syllables instead of readings, or using syllables or morphemes as character units.

As mentioned above, the search device in accordance with Embodiment 1 is constructed in such a way as to include: the name analysis unit 21 for dividing name data which consists of a character string both into words and into characters to generate start and end scores showing a start and an end of each of the words and start and end scores showing a start and an end of each of the characters; the start and end information adding unit 22 for extracting partial character strings which construct the name data to define the partial character strings as entries, and for adding a list showing the position of each of the entries in the name data, the start and end scores of each word and the start and end scores of each character included in the entry (a name ID, a position, and start and end scores) to the entry; and the partial character string index generating unit 23 for sorting the output results acquired by the start and end information adding unit 22 in order of the entries to generate indexes. Therefore, the search device can generate indexes including language information in units of a character which is a minimum unit, and language information in units of a word which is a longer unit. As a result, the search device can implement a high-precision fuzzy match search.

Further, the search device in accordance with Embodiment 1 is constructed in such a way as to include: the partial character string decomposing unit 41 for extracting partial character strings which construct an input character string; the partial character string index referring unit 42 for acquiring the list (a name ID, a position, and start and end scores) of each of one or more candidate entries corresponding to each of the partial character strings for each name data from the indexes which are generated in advance and stored in the index storage unit 30, the candidate score updating unit 43 for judging the continuity in the candidate name data between candidate entries which the partial character string index referring unit 42 has acquired on the basis of their lists (each having a name ID, a position, and start and end scores), for adding a maximum comparison score sc(i,j) to one of the candidate entries which the candidate score updating unit has determined is continuous to the other candidate entry or adding a comparison score sc(i,j) according to the validity of connection with each of candidate entries placed before and after the candidate entry which the candidate score updating unit has determined is discontinuous to the other candidate entry to the candidate entry on the basis of the start and end scores of this candidate entry, for calculating a candidate score score[id] by summing the comparison score sc(i,j) of each candidate entry included in the candidate name, and for sorting the candidate names in descending order of the candidate score score[id] to output them. Therefore, while the search device can make a search on the basis of characters which are minimum units, the search device can make a search by taking into consideration the linguistic validity based on words which are longer units. Therefore, even if the candidate for name is not the input character string itself or even in a case of making an imperfect partial match search, the search device can carry out the search and can implement the search with a high degree of precision and in a fuzzy manner. Particularly, the search device can improve the robustness thereof in a case in which the input is a voice and the input character string includes a misrecognition result.

Further, the candidate score updating unit 43 in accordance with Embodiment 1 is constructed in such a way as to determine that continuity is maintained when a travel distance between a partial character string which is included in the input character string and to which a comparison was made the last time and a partial character string to which a comparison is being made and a travel distance between the candidate entries in the candidate name respectively corresponding to the partial character strings are equal to or shorter than predetermined travel distances, respectively. Therefore, by adjusting the above-mentioned predetermined travel distances for judging the continuity, the candidate score updating unit can calculate the candidate score in consideration of the boundary between words, the boundary between characters, input errors, and variant patterns of exchanged words. Therefore, compared with a conventional fuzzy match search method which does not take these into consideration, the present embodiment can provide a higher degree of search accuracy.

Further, the candidate score updating unit 43 in accordance with Embodiment 1 is constructed in such away as to adjust the comparison score sc(i,j) according to the travel distance between candidate entries in each name candidate. Therefore, by providing a penalty for the comparison score sc(i,j) when the travel distance is negative, the search device can suppress the extraction of a paraphrase from the indexes, thereby being able to further improve the search accuracy.

In a case in which the search device is constructed of a computer, a search program in which the process descriptions of the index generating unit 20, the index storage unit 30, and the searching unit 40 are written can be stored in a memory of the computer and a CPU of the computer can be made to execute the search program stored in the memory.

INDUSTRIAL APPLICABILITY

As mentioned above, because the search device in accordance with the present invention can make a search in consideration of the boundary between words, the boundary between characters, input errors, and variant patterns of exchanged words to acquire candidates having a high degree of validity from among partially matching candidates including a candidate having a different word order and a candidate having a partial omission, the search device in accordance with the present invention is suitable for use as a search device for voice recognition or the like.

The invention claimed is:
1. A search device comprising:
circuitry configured to:
extract partial character strings which are portions of an input character string;
acquire position information and boundary information of an entry, corresponding to each of said partial character strings, for each name data from indexes which are generated in advance;
determine continuity in said each name data between entries which are acquired on a basis of said position information such that the continuity is determined to exist when a travel distance between arbitrary partial character strings within a single word included in the input character string and a travel distance between entries within a single word in name data corresponding to said arbitrary partial character strings are equal to or shorter than predetermined distances, respectively; and
add a maximum comparison score to one of said entries which is determined to be continuous to the other entry, and add a comparison score according to validity of continuity with each of entries placed before and after said entry which has been determined to be discontinuous to the other entry to said entry on a basis of said boundary information.

2. The search device according to claim 1, wherein said circuitry adjusts the comparison score according to a positional relationship between the entries in the name data.

3. The search device according to claim 1, wherein said circuitry calculates a candidate score by summing a comparison score of each entry included in the name data, and sorts said name data in descending order of said candidate score and outputs said name data.

4. A non-transitory computer readable medium including computer executable instructions for a search program for causing a computer to perform a method comprising:

extracting partial character strings which are portions of an input character string;

acquiring position information and boundary information of an entry, corresponding to each of said partial character strings, for each name data from indexes which are generated in advance;

determining continuity in said each name data between entries which are acquired on a basis of said position information such that the continuity is determined to exist when a travel distance between arbitrary partial character strings within a single word included in the input character string and a travel distance between entries within a single word in name data corresponding to said arbitrary partial character strings are equal to or shorter than predetermined distances, respectively; and adding a maximum comparison score to one of said entries which is determined to be continuous to the other entry, and adding a comparison score according to validity of continuity with each of entries placed before and after said entry which has been determined to be discontinuous to the other entry to said entry on a basis of said boundary information.

5. The search device according to claim 1, wherein the validity of continuity is a linguistic validity of continuity.

* * * * *